United States Patent [19]

Kawabata et al.

[11] Patent Number: 5,444,829
[45] Date of Patent: Aug. 22, 1995

[54] SYSTEM FOR CENTRALLY CONTROLLING LETTER DATA

[75] Inventors: Atsushi Kawabata; Shuuichi Miura; Kimiya Yamaashi, all of Hitachi; Yuji Taki, Takasaki; Yoshiki Kobayashi; Shinya Tanifuji, both of Hitachi, all of Japan

[73] Assignee: Hitachi, Ltd., Tokyo, Japan

[21] Appl. No.: 997,628

[22] Filed: Dec. 28, 1992

Related U.S. Application Data

[63] Continuation of Ser. No. 395,764, Aug. 18, 1989, abandoned.

[30] Foreign Application Priority Data

Aug. 24, 1988 [JP] Japan .................................. 63-208397

[51] Int. Cl.⁶ .................................................. G06T 11/00
[52] U.S. Cl. ............................... 395/100; 395/150; 395/151
[58] Field of Search ........................... 395/141–143, 395/150, 151, 100, 200, 600, 800; 364/DIG. 1, DIG. 2; 358/426

[56] References Cited

U.S. PATENT DOCUMENTS

| | | | |
|---|---|---|---|
| 4,943,869 | 7/1990 | Horikawa et al. | 358/426 |
| 4,954,979 | 9/1990 | Eibner et al. | 395/150 |
| 5,018,078 | 5/1991 | Urabe et al. | 364/518 |
| 5,027,304 | 6/1991 | Jeng et al. | 395/150 |
| 5,220,674 | 6/1993 | Morgan et al. | 395/800 |

*Primary Examiner*—Almis R. Jankus
*Attorney, Agent, or Firm*—Kenyon & Kenyon

[57] ABSTRACT

A plurality of letter output devices (workstations, printers) are connected to a letter data control device by a transmission path. The control device stores letter data for transmission to the letter output devices, and is able to convert that letter data to a desired layout (e.g. from a vector font to a dot font) and then transmits the converted letter data to one or more of the letter output devices. The control device is able to select part of its stored letter data for transmission so that only commonly used letter data need be transmitted during start up of the system. Since a large amount of letter data may be stored in the control device, and only part may be transmitted to the letter output devices, those output devices can have a relatively small memory.

41 Claims, 5 Drawing Sheets

SYSTEM FOR CENTRALLY CONTROLLING LETTER DATA

This application is a continuation of application Ser. No. 07/395,764, filed Aug. 18, 1989, now abandoned.

BACKGROUND OF THE INVENTION

1. Field of the Invention

The present invention relates to control of letter or text data among a plurality of devices which will make use of that data. The present invention is applicable to a letter data control system, a letter data control method, and to a letter data control device which may form part of that system.

The present invention is particularly, but not exclusively, concerned with the situation where a plurality of work stations are connected to a common printer such as a laser printer.

2. Summary of the Related Art

In document processing or editing, it is now increasingly common to make use of distributed processing, in which various documents are created at a plurality of work stations, and printed at a printer or printers connected to the work stations via a data network forming a transmission path between the work stations and the printer(s). In a basic type of such a system, the printer has a predetermined font, and each work station has to contain font data corresponding to that stored by the printer if the work stations are to display the same result, and/or to print the same results. For languages based on a large number of characters, this means that letter data of many styles and sizes must be stored in each device that is to use the letter data (work station, printer, etc). For example, in the case of Japanese some 7000 characters are used, and therefore must be stored. Therefore, each device that is to use the letter data must have a very large memory, and this is expensive. Furthermore, if new font data is added to the system, or the original font data is changed, every device that is to use the data (work station, printer) has to receive the same new font data.

It is also known to make use of a device known as a file server which is connected to the network between the work stations and the printer. The file server stores centrally a plurality of font files, and the font file needed by each work station and each printer is transmitted via the network to the work station or printer as appropriate. In this way, the memory space of the work stations and printers may be reduced, since they only need to store the font file for the font they are using at any particular time. However, in such a system, the whole of any given font file must be transmitted.

At this stage is is important to distinguish between the term "font file" and the term "letter data". In a conventional file server, the file server cannot analyze the content of a given font file, and must transmit all of that font file. Each font file is divided into letter data and each font file stores a complete set of letter data.

It is also important to appreciate a difference between fonts. It is possible to store letter data i.e. data representing a character in a number of ways. Each of these ways is known as a font, and fonts can be grouped into vector fonts and dot fonts. Dot fonts store the character in the font of a series of dots which are printed by the printer. Dot fonts are easy to use, and permit a high output rate. However, magnification or rotation of the character causes the character shape to be disturbed or broken, and if large letters are needed, they will involve a large number of dots and therefore a large storage capacity is required. Vector fonts, on the other hand, store part of the information. The term "vector fonts" in this specification includes stroke fonts, which record the co-ordinates of key nodes of a character, and information relating to the width of the lines between those codes, line fonts, which record the co-ordinates of the outline of the character, and meta fonts which store only part of a given character, so that a given character is formed by assembling a plurality of letter data from the meta font. Vector fonts have the advantage that they can be magnified or rotated without causing a break in the shape, but are more complicated and therefore produce a slower output. Therefore, if the font used at the printer is a vector font, printing will be slow, whilst if it is a dot font, the quality of the printing may be compromised.

SUMMARY OF THE INVENTION

The present invention seeks to overcome, or at least ameliorate, the problems of the prior art.

It does this by having two aspects which may be applied independently, but preferably are applied together. In the first aspect, the present invention proposes that the distributed network includes a letter data controller (hereinafter referred to as a font server) which is able to convert letter data to a desired data layout, and transmit that desired data layout to at least one of the devices which is to use the data layout. The letter data is stored in the font server in a plurality of fonts, normally of different font types (dot data, vector data etc). The conversion then converts letter data from one of those fonts to the desired form, e.g., converting vector data in one form to dot data and then that dot data is transmitted.

The font server of the present invention differs from a conventional file server in that it is capable of acting on only a part of a file, e.g., a single character and thus is is capable of knowing the content of each file. Furthermore, according to the first aspect discussed above, the font server is able to process any part of the file to convert that part to the desired font.

The second aspect of the present invention makes use of the fact that some characters are used more frequently than others. The present invention proposes that the font server is able to select a part only of the letter data in a selected font file and transmit that selected part of the letter data to the appropriate device which is to use the letter data. Thus, the font server may transmit only the most commonly used characters to the work stations and/or printer. Of course, if a work station or printer needs to make use of a character which is uncommon, and therefore has not been supplied, it must request the appropriate letter data to be transmitted from the font server, but the loss in operating speed for that particular character is normally acceptable, particularly if the font server is able to select only that character (from the desired font file) for transmission to the printer and work station.

Furthermore, by providing a cache memory in the work stations and/or printer the unusual character may be stored in case it is needed again.

The present invention has a number of further developments. Firstly, it is possible for the font server to transmit the desired data layout (corresponding to letter data from a font file, or a selected part of a font file) automatically when the system is first started up.

Alternatively, however, it is possible for there to be an interaction between the font server and the devices which are to use the letter data (work stations, printer) so that a signal is sent from each device to the font server, which signal determines the font, the font file, and possibly the part of the font file which is to be transmitted.

As was mentioned above, it is envisioned that the desired data layout transmitted from the font server will correspond to a dot font. However, it is possible for a font server to convert the fonts to a vector font, e.g., an outline font, and to transmit the data in the form of that vector font. Each work station and/or printer can then either convert the outline font data to dot data and store that dot font data, or to store the outline font data and to convert to dot font data only when needed. In the latter case, the work station and/or printer may itself determine the magnification of the dot font character, by permitting the work station and/or printer to expand from the outline font data before it is stored.

A further development of the present invention is concerned with speeding up the transmission of data between the font server and work station etc. If for example, the font data is converted to dot font data before transmission, it is further possible to compress that dot font data before transmission ocurrs. The dot font data is then transmitted in compressed form to the work station and/or printers, and may then be re-expanded and stored, or stored in compressed form and expanded only when needed.

Although it is principally envisioned that the font server be a separate device (and an aspect of the present invention relates to the structure of the font server itself), the font server need not be a separately identifiable device, but the functions of the font server discussed above may be achieved by suitable programming of a standard computer connected to a letter data storage device. That computer is then connected to the work stations and/or printer and may carry out any or all of the functions discussed above.

Thus, the present invention permits centralised control of letter data between work stations and printers. It is thus possible to keep only one set of letter data within the system, which is advantagous when it is considered that there may be a very large quantity of that letter data, and a large memory need be provided only in one device (the font server). In order to create letter data for new letters, or a new size of letter, it is necessary only to add to the letter data in the font server. Furthermore, by storing only frequently used letter data at the letter output device, it is possible to shorten the transmission time of the letter data, reduce the time required for letter output, and also to limit the number of times that the system need activate the font server.

BRIEF DESCRIPTION OF THE DRAWINGS

Embodiments of the present invention will now be described in detail by way of example, with reference to the accompanying drawings in which.

DETAILED DESCRIPTION

Figure 1:
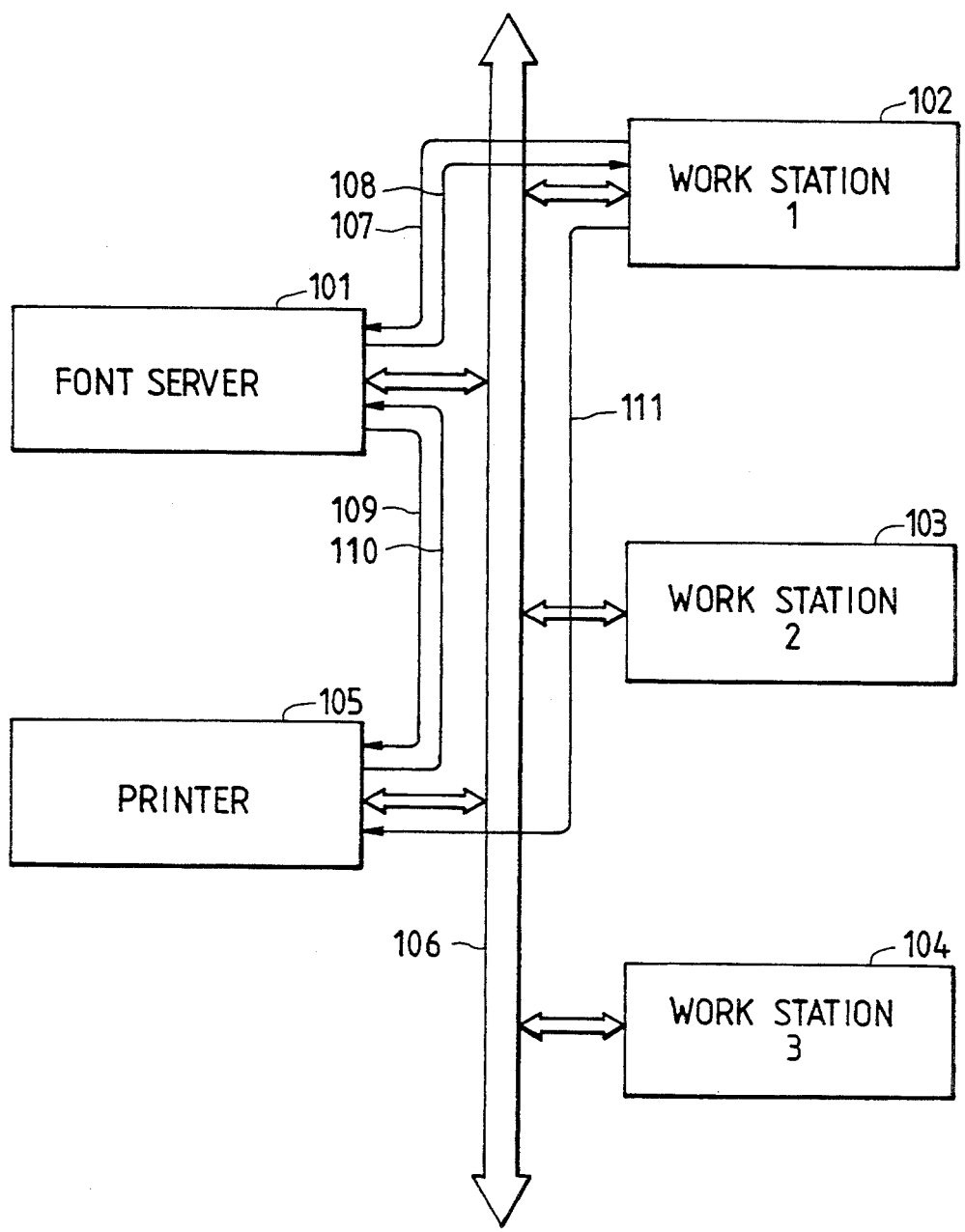
FIG. 1 shows a schematic block diagram of a letter data control system according to a first embodiment of the present invention.

The first embodiment of the present invention will now be described with reference to FIGS. 1 to 3. In this first embodiment, the present invention is applied to a document processing system in which a font server (letter data controller) 101 is connected to a plurality of work stations 102, 103, 104, and to a printer 105 via a communication circuit 106 forming a transmission path for data. The font server 101 will be discussed in more detail later. Each of the work stations 102, 103, 104 and the printer 105 may be conventional, and contain a font cache to store letter data temporarily. The work stations permit documents to be created, and edited, and the work stations can then cause the documents to be printed by the printer 105.

The operation of the system of FIG. 1 will now be described. Users create documents, or edit documents already made, using the work stations 102, 103, 104. When it is necessary to display letter data on the display of a given work station 102, 103, 104, the first step is to check whether or not the letter data to be displayed is present in the font cache of that work station. If that data exists, the letter data may be immediately displayed using the information in that cache. If the data is not present, a signal 107 is sent from the work station to the font server through the communication circuit 106. The font server 101 then transmits the request letter data or data in which the requested data has been converted, to the work station 102 through the communication circuit 106. This is indicated by arrow 108. The work station 102 can then out put the letter data using the letter data received, and at the same time can store that letter data in the font cache in case that letter data is needed again. To print that document, a command signal to control the printer is transferred to the printer by converting the document data in the work stations, or by transmitting the document data itself to the printer 105 as illustrated by step 111.

When the printer has been requested to print a document it first checks whether or not the letter data corresponding to the characters of that document are present in its font cache. If the data is present, the printer 105 can print the characters using the letter data. If not, the printer 105 signals, via the communication circuit 106, to the font server 101, as illustrated by arrow 110. The font server 101 transmits the requested letter data, or data in which the required character is converted, to the printer 105, as indicated by arrow 109. The printer outputs the characters using the received letter data and at the same time stores that letter data in its font cache.

It should be borne in mind that the font server 101 stores letter data in a plurality of font files, and there are normally different fonts in those font files. Thus, dot font and vector fonts (stroke fonts, outline fonts, meta fonts) are stored in the font server 101. The work stations 102, 103, 104 and/or the printer 105 request letter data from the font server 101 by designating the type of letter (e.g. Gothic or other forms as appropriate, the size of the letter, the shape of the letter, etc). The font server 101 then retrieves the appropriate font data, and normally converts vector fonts to dot fonts, and transmits the converted data to the work stations 102, 103, 104, printer 105.

The system of FIG. 1 may be used in a different way, however, when the letter data to be used by the work stations, 102, 103, 104 and the printer 105 is at least partially predetermined (e.g. because it is known that part of the letter data is commonly used). In this case, the font server 101 may automatically output that predetermined letter data to the communications network 106, for storage in the cache memories of the work stations 102, 103, 104 and the printer 105. That stored font data may then be used.

In a further variation, the stations and/or printer may signal to the font server 101 if the font file is to be transmitted, again that font file being transmitted and stored in the cache memory.

It should be remembered that it is not necessary that the whole of the font file be transmitted. In cases where it is known that only a limited number of characters is to be used from a font file (either generally throughout the network or at a given work station or printer) it is then possible for the font server 101 to transmit only a part of the letter data in any given font file, for example transmitting only the most commonly used Japanese characters.

The structure of the font server 101 will now be described in more detail with reference to FIG. 2.

As illustrated, the font server 101 has a network control device 201 which connects the font server 101 to the communication network 106. The font server 101 also has a letter data converter 202, a main control device 203, and a letter data storage device 204 which are interconnedted via a bus 205.

The letter data storage device 204 stores letter data in a plurality of font files, e.g., in dot font format, stroke font format, and outline format. Normally, the letter data storage device will store letter date in vector format, because although that format requires a long time for letter display, it permits the letters to be expanded as desired, and their shapes changed. The letter data storage device stores a large quantity of letter data and may be, e.g., a hard disc. The main control device 203 and the network control device 201 may be conventional.

Figure 2:
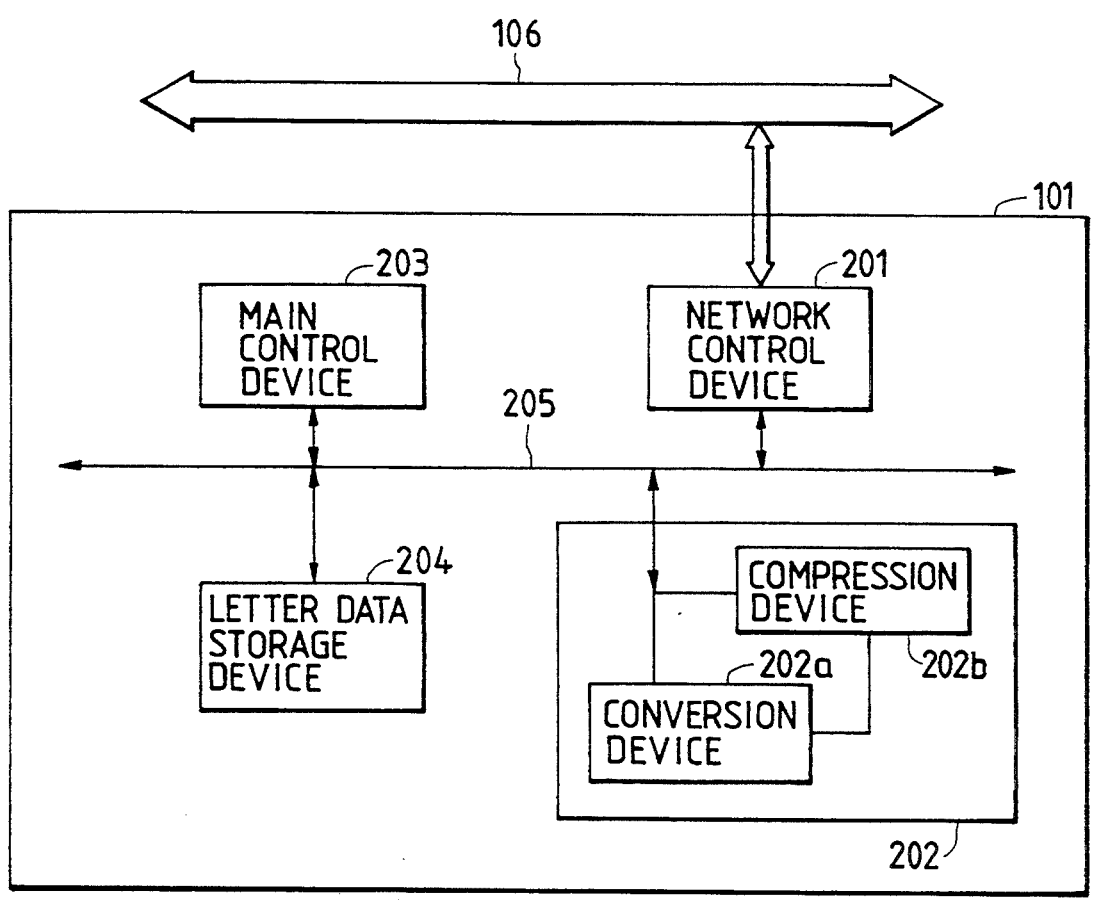
FIG. 2 shows a block diagram of the font server of FIG. 1.

As can be seen from FIG. 2, the letter data controller has a data conversion device 202a and a data compression device 202b. The function of the letter data conversion device 202a is to convert the letter data to a suitable form for transmission, e.g., to convert vector data to dot data. The function of the data compression device 202b is to compress the letter data, e.g., by known data compression techniques involving the selection of key components of the data. Such compression speeds up data transmission.

When the network control device 201 receives a command requesting letter data via the network 106, the main control device 203 selects the requested letter data from the letter data storage device 204, and transmits the data either directly to the network control device for sending to the network 106, or transmits the letter data to the letter data converter 202. The letter data converter 202 converts the letter data in accordance with predetermined procedures, and then the converted letter data is output into the network 106.

Figure 3:
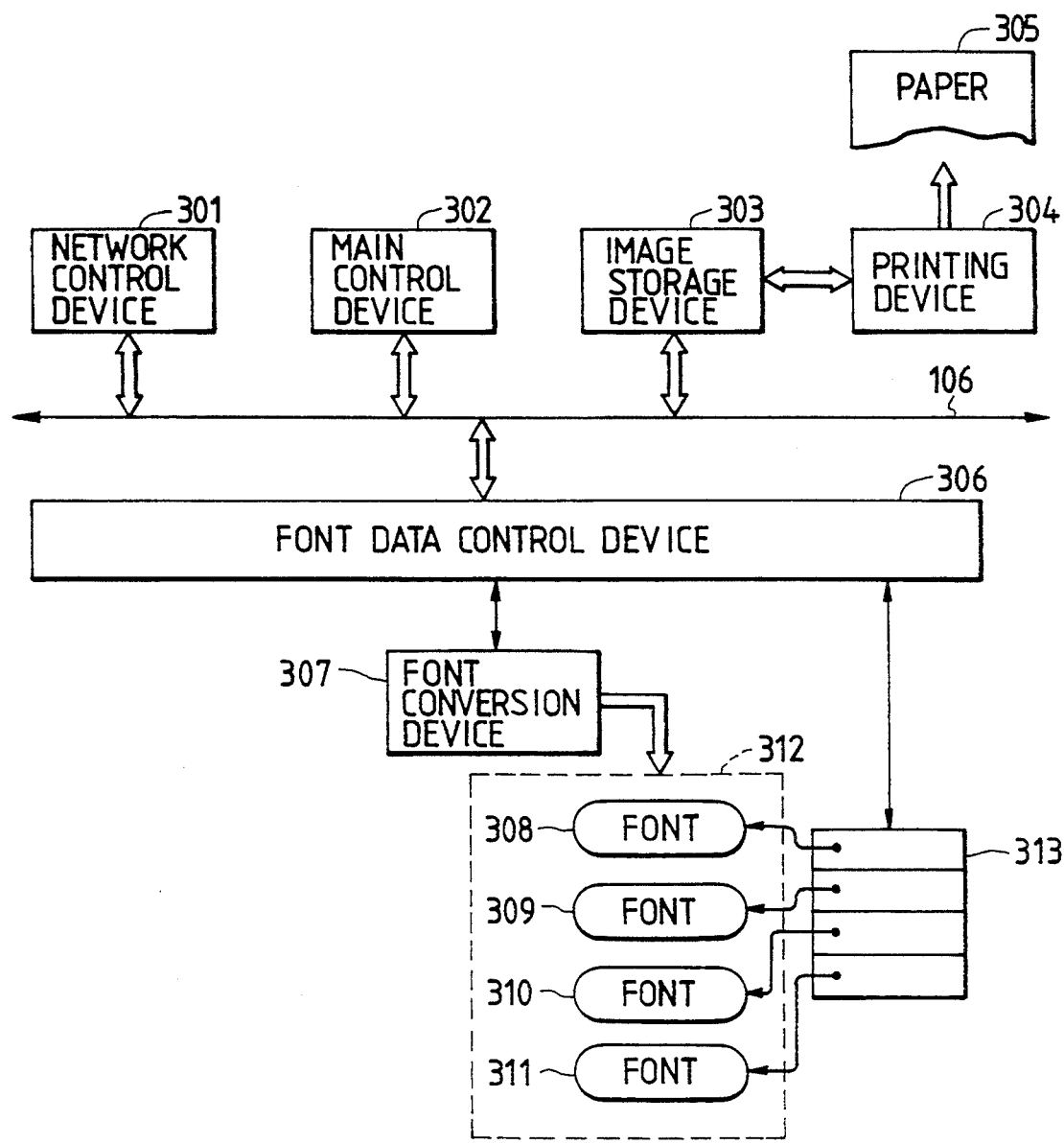
FIG. 3 shows a block diagram of the printer used in the system of FIG. 1.

Although as mentioned above, the work stations 102, 103, 104 and the printer 105 may be conventional, FIG. 3 illustrates the relevant structure of the printer. Referring to FIG. 3, a network control device 301 receives data from the network 106, of transmits data to the network 106, a main control device 302 controls the whole printer. An image storage device 303 stores data fop printing output data in the form of a bit map, and that bit map is transmitted to a printing device 304 which prints characters onto paper 305 using the data stored in the image storage device 303.

A font data control device 306 makes dot format data from the requested font by controlling the font cache of font conversion derive. The font conversion device is shown at 307, and converts font data other than dot font data which has been received by network control device 301 into dot font data stored as temporary fonts 308, 309, 310, and 311 in font cache 312. That font cache is controlled by a font cache control table 313.

When the network control device 301 receives a letter output command from e.g. a work station, the main control device 302 analyzes the command, determines the type, shape, size and sort of letter to be output, and requests the font data control device 306 to obtain the character from the appropriate dot font. Using the cache control table 313, the font data control device 306 checks whether the requested font has been converted into dot font format and is stored in the font cache 312. If the requested font is stored in the font cache 312, the image is printed using dot font.

However, if the requested font is not stored in the cache 312, a signal is sent to the font server 101 to signal for the transmission of the appropriate letter data. To achieve this, a command is transferred to the network control device 310, which sends a signal by the network 106. The font data sent through the network 106 is stored in the font cache 312, if necessary, with that data being converted by the font conversion device to a dot font format. The main control device 302 transmits the received dot font to the designated territory of the image storage device 303. After the appropriate number of characters have been transferred to that device 303, the printer 304 prints the characters using the data stored.

This structure illustrates how letter data can be centrally controlled, and transmitted to an appropriate device that is to use that data (in this case the printer) for use.

Figure 4:
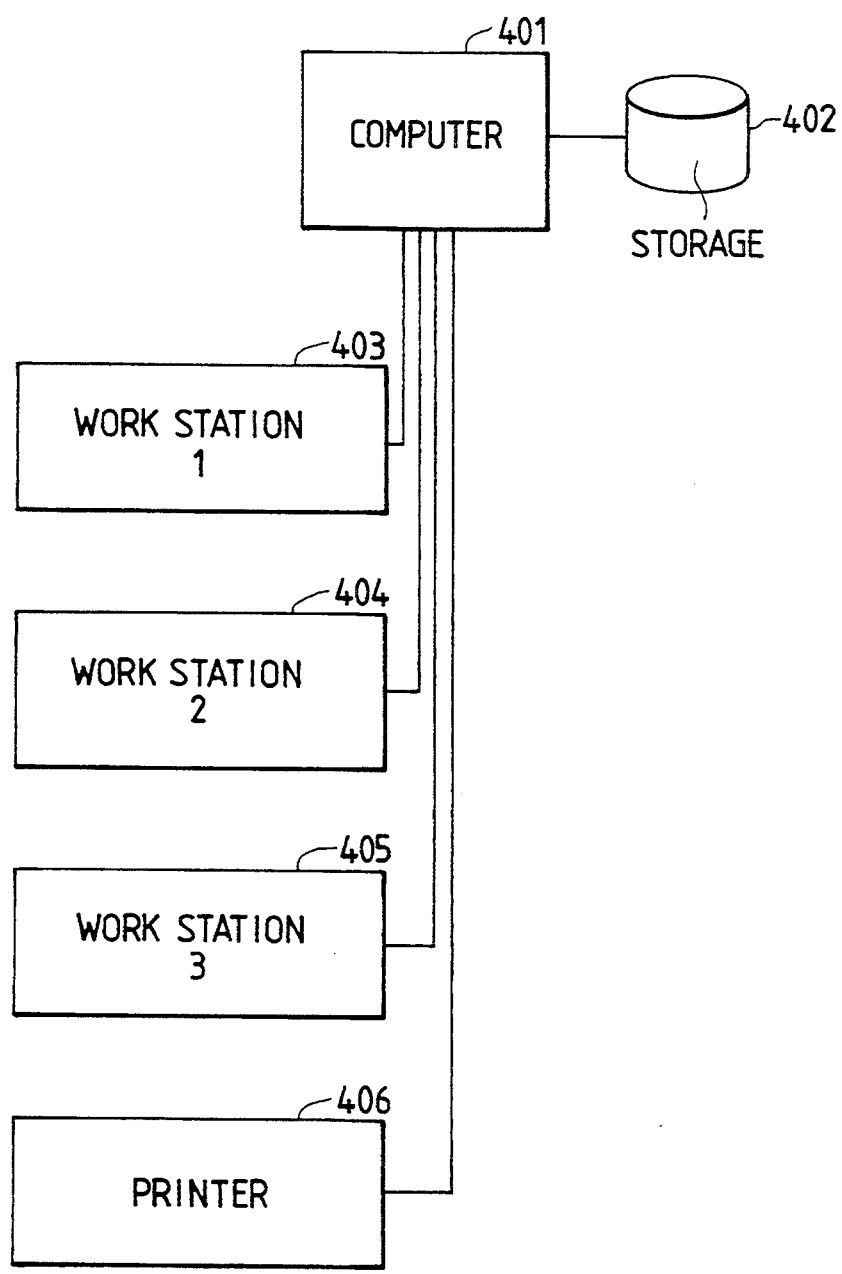
FIG. 4 shows a second embodiment of the present invention, in which the invention is achieved by programming a computer.

As was mentioned earlier, it is not necessary that the font server be a separately identifiable component of the system, but its functions may be carried out by a part of a standard main-frame computer. FIG. 4 illustrates such an arrangement.

In FIG. 4, a main-frame computer 401 is connected to a plurality of work stations 403, 404, 405, and to a printer. Letter data is stored in a letter data storage device 402. The work stations 403, 404, 405, and the printer 406 may be conventional ones, as discussed earlier.

In operation, new text is created, or already existing text is edited, using the work stations 403, 404, 405. During that time, or when it is necessary to display letter data on a display of the work station, it is first checked whether or not the appropriate letter data exists in a font cache inside the appropriate work station 403, 404, 405. If that data exists, the letter may be immediately output. If not a signal is sent to the main-frame computer 401, which obtains the necessary data from the letter data storage device 402 and then transmits that data to the work station 403, 404, 405, or printer 406 as appropriate. That letter data is then stored in the corresponding cache, and can then be output when needed. Similarly, text created or edited at a work station 403, 404, 405 can be transmitted to the printer 406 for printing, with again the printer checking if the letter data is stored in the appropriate font cache, and if not signaling to the main-frame computer 401 to transmit the appropriate letter data to the printer 406.

Thus, all the functions of the font server are carried out by the computer 401 and letter data storage device 402. The processing necessary to achieve functions of the font server are achieved by suitable programming of a computer 401.

Figure 5:
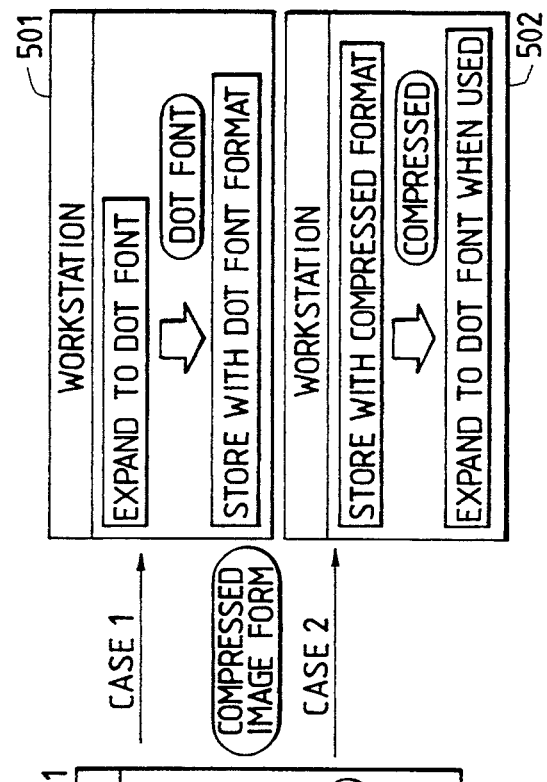
FIG. 5 shows two alternatives of an embodiment of the present invention involving data compression.

As was described above, the font server may compress the data as well as converting it to a suitable dot format, as was described with reference to FIG. 2. FIG. 5 illustrates two cases in which this system has been used.

In FIG. 5, the font server converts from an appropriate font (e.g. an outline font), to a dot font, and then the dot font data is compressed. This is carried out, e.g., by the data conversion device 202a and data compression device 202b in FIG. 2. In this converted and compressed form, the letter data is transmitted to a work station. The two cases then illustrated in FIG. 5 show what may then happen.

In the first case, discussed with reference to work station 501, the converted and compressed data is immediately expanded when it is received by the work station so that the complete dot font data is re-created. In this form the data is stored in dot font format. In the second case, illustrated with reference to work station 502, the data from the font server 101 is stored in compressed form, and then expanded to dot font format only when it needs to be used. As can be imagined, the second case needs less memory space.

Figure 6:
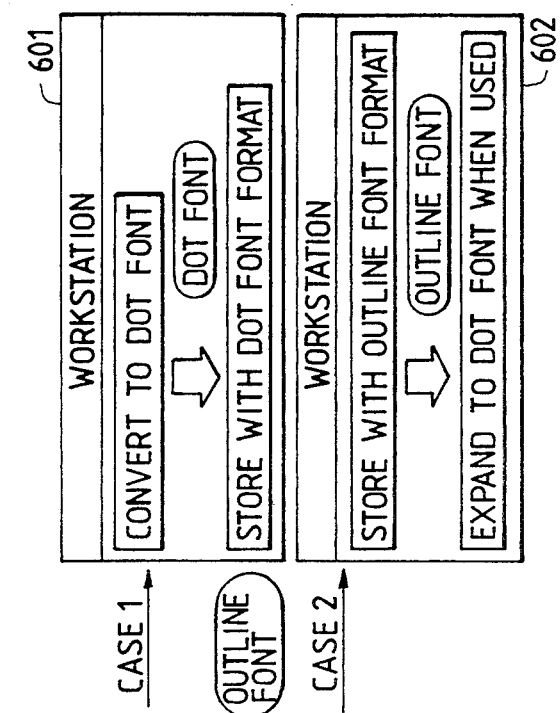
FIG. 6 shows two alternatives of an embodiment of the present invention in which vector data is transmitted.

FIG. 6 illustrates another alternative, in which the font server 101 converts all the various stored fonts to, e.g., an outline font format, and data is transmitted in outline font Format to the work stations. Again, there are two possibilities for subsequent processing. In the first case illustrated with reference to work station 601, the outline font transmitted is converted to dot font format, and stored in that form. In the second case, illustrated with reference to work station 602, the out line font data is stored in that form, and is only expanded and converted to dot font when it is to be used.

Although FIGS. 5 and 6 have been described with reference to transmittal of data to work stations, the same procedures can apply for transmission to the printer.

Similar conversion and expansion options may also be used in the main-frame computer based system of FIG. 4. In this case, there is a further possibility. When information is transmitted from the work stations 403, 404, 405, to the printer 406 for printing, it may first be converted to "page description language", which is primarily used for graphics. This conversion to page description language may occur at the work station or at the computer 401.

Thus, in conclusion, the present invention makes use of a font server to transmit letter data to work stations, printers, etc. It provides a centralized store for that letter data, and permits only that letter data that is to be used by the work stations, printer etc to be stored at distributed locations. Thus, the present invention permits the following advantages to be achieved:

1. It is unnecessary to store all the font data at a plurality of locations within the system, and therefore savings in memory space can be made.
2. As the same letter data can be transmitted to a plurality of letter output devices in this system, the same output results can be obtained even if different printers, work stations, etc., are used.
3. As letter data are centrally stored and controlled, any letter data conversion can be central also, thereby simplifying changes between font formats.
4. As letter data is centrally controlled, if letter data is to be changed it is only necessary to change that letter data at one location, not at several locations.

What is claimed is:

1. A system for centrally controlling letter data comprising:
    a) a plurality of letter data output devices;
    b) a letter data controller controlling said letter data output devices; and
    c) a transmission path interconnecting said letter data output devices and said letter data controller;
    wherein said letter data controller includes:
        (i) means for storing commonly used letter data having a font format;
        (ii) means for comparing stored letter data in said means for storing with a desired data format according to a request from one of said letter data output devices;
        (iii) means for converting said letter data to said desired data format according to a result from said means for comparing; and
        (iv) means for transmitting said desired data format to at least one of said letter data output devices via said transmission path;
    wherein at least two of said plurality of letter data output devices are arranged to signal to said letter data controller via said transmission path for causing said letter data controller to transmit said desired data format;
    wherein said at least two of said letter data output devices are arranged to store said desired data format; and
    wherein a further one of said letter data output devices includes means for storing a plurality of desired data formats stored by said at least two of said letter data output devices.

2. A data processing system for processing data and outputting font data comprising:
    a) a plurality of data processing apparatuses for processing data, wherein said data includes request data for requiring font data having a font format;
    b) a font server for converting font data stored therein to required font data having a required font format according to a request data sent from one of the data processing apparatuses and outputting said required font data to each data processing apparatus; and
    c) a transmission path interconnecting said plurality of data processing apparatuses and said font server for transmitting the request data from the plurality of data processing apparatuses to the font server and for transmitting the font data from the font server to the data processing apparatuses.

3. The data processing system according to claim 2, wherein said font server further comprises:
    a) a font data memory apparatus for storing the font data having the font format;

b) a main control device for comparing the font format of said font data stored in said font data memory apparatus with a desired font format according to said request data from one of said data processing apparatus;

c) a conversion device for converting said font data stored in the font data memory to said desired font data with said desired font format according to a result from said main control device; and d) a network control device for controlling said transmission path to transmit said converted font data with said desired font format to at least one of said data processing apparatus.

4. The data processing system according to claim 3, wherein said font data memory apparatus comprises a hard disk apparatus.

5. The data processing system according to claim 3, wherein said font data memory apparatus stores at least one of either dot font data or vector font data.

6. The data processing system according to claim 5, wherein said vector font data includes at least one of either stroke font data, outline font data or meta font data.

7. The data processing system according to claim 3, wherein said conversion device converts vector font data to dot font data.

8. The data processing system according to claim 7, wherein said vector font data includes at least one of either stroke font data, outline font data or meta font data.

9. The data processing system according to claim 3, wherein said font server further comprises a compression device for compressing said converted font data.

10. The data processing system according to claim 9, wherein said another font format comprises a dot font format.

11. The data processing system according to claim 3, wherein said conversion device converts the font format of said font data stored in said font data memory apparatus to another font format that is different from the font data that is stored in said font data memory apparatus.

12. The data processing system according to claim 9, wherein at least one of said data processing apparatuses includes:

a) a main control device for generating control signals;

b) a network control device for transmitting data to or from said transmission path according to said control signals;

c) an image storage device for storing output data which includes said font data or graphic data according to said control signals;

d) an outputting device for outputting said output data to a data output apparatus from said image storage device according to said control signals;

e) a font cache memory device for storing some font data with a font format for said data processing apparatus; and f) a font data control device for determining whether said font data which is desired by said data processing apparatus has been stored in said font cache memory device according to said control signals and controlling the outputting of said font data from either said font cache memory device or from said font server according to a result of said determination.

13. The data processing system according to claim 12, wherein said at least one of said data processing apparatuses further includes a font conversion device for converting a font format of said font data from said font cache memory device or said font server to a different font format of said font data.

14. The data processing system according to claim 13, wherein said different font format comprises a dot font format.

15. The data processing system according to claim 12, wherein at least one of said data processing apparatus includes a further font conversion device for decompressing said font data which has been compressed upon receipt from said font cache memory device or said font server.

16. The data processing system according to claim 12, wherein said data output apparatus comprises a printer apparatus.

17. The data processing system according to claim 12, wherein said data output apparatus comprises a display apparatus.

18. The data processing system according to claim 12, wherein said font cache memory device stores at least one of either vector font data or dot font data.

19. The data processing system according to claim 18, wherein said vector font data includes at least one of either stroke font data or meta font data.

20. The data processing system according to claim 2, wherein at least one of said data processing apparatuses comprises a printing apparatus, and said printing apparatus comprises:

a) a main control device for generating control signals;

b) a network control device for transmitting data to or from said transmission path according to said control signals;

c) an image storage device for storing output data which includes said font data or graphic data according to said control signals;

d) a printing device for printing output data from said image storage device to printing material;

e) a font cache memory device for storing some font data with a font format for said data processing apparatus;

f) a font data control device for determining whether said font data that is desired by said data processing apparatus has been stored in said font cache memory device according to said control signals and controlling the outputting of said font data from either said font cache memory device or said font server according to a result of the determination.

21. The data processing system according to claim 20, wherein at least one of said data processing apparatuses further comprises a further font conversion device for converting the font format of said font data sent from said font cache memory device or said font server to a different font format of said font data.

22. The data processing system according to claim 21, wherein said different font format comprises a dot font format.

23. The data processing system according to claim 20, wherein at least one of said data processing apparatuses further comprises a further font conversion device for decompressing said font data which has been compressed upon receipt from said font cache memory device or said font server.

24. The data processing system according to claim 20, wherein said font cache memory device stores at least one of either vector font data or dot font data.

25. The data processing system according to claim 24, wherein said vector font data includes at least one of either stroke font data, outline font data or meta font data.

26. The data processing system according to claim 2, further comprising a plurality of data output apparatuses, at least one of the data output apparatuses being controlled by one of the data processing apparatuses and displaying font data from said one of the data processing apparatuses or said font server.

27. The data processing system according to claim 26, wherein at least one of said data output apparatuses includes:
a) a main control device for generating control signals;
b) a network control device for transmitting data to or from said transmission path according to said control signals;
c) a font cache memory device for storing some font data with a font format for said data processing apparatus; and
d) a font data control device for determining whether said font data that desired by said data processing apparatus has been stored in said font cache memory device according to said control signals and controlling the outputting of said font data from either said font cache memory device or said font server according to a result of the determination.

28. The data processing system according to claim 27, wherein at least one of said data processing apparatus comprises a further font conversion device for converting a font format of said font data from said font cache memory device or said font server to a different font format of said font data.

29. The data processing system according to claim 28, wherein said different font format comprises a dot font format.

30. The data processing system according to claim 26, wherein said data output apparatus comprises a printer apparatus.

31. The data processing system according to claim 27, wherein at least one of said data processing apparatus comprises a further font conversion device for decompressing said font data which has been compressed upon receipt from said font cache memory device or said font server.

32. The data processing system according to claim 27, wherein said font cache memory device stores at least one of either vector font data or dot font data.

33. The data processing system according to claim 32, wherein said vector font data includes at least one of either stroke font dam, outline font data or meta font data.

34. The data processing system according to claim 2, wherein at least one of said data processing apparatus includes:
a) a main control device for generating control signals;
b) a network control device for transmitting data to or from said transmission path according to said control signals;
c) a font cache memory device for storing some font data with a font format for said data processing apparatus; and
d) a font data control device for determining whether said font data that is desired by said data processing apparatus has been stored in said font cache memory device according to said control signals and controlling the outputting of said font data from either said font cache memory device or said font server according as a result of the determination.

35. The data processing system according to claim 34, wherein at least one of said data processing apparatus further comprises a further font conversion device for converting a font format of said font data from said font cache memory device or said font server to a different font format of said font data.

36. The data processing system according to claim 35, wherein said different font format comprises a dot font format.

37. The data processing system according to claim 34, wherein a further font conversion device for decompressing said font data which has been compressed upon receipt from said font cache memory device or said font server.

38. The data processing system according to claim 34, wherein said data output apparatus comprises a printer apparatus.

39. The data processing system according to claim 34, wherein said data output apparatus comprises a display apparatus.

40. The data processing system according to claim 34, wherein said font cache memory device stores at least one of either vector font data or dot font data.

41. The data processing system according to claim 40, wherein said vector font data includes at least one of either stroke font data, outline font data or meta font data.

* * * * *

UNITED STATES PATENT AND TRADEMARK OFFICE
CERTIFICATE OF CORRECTION

PATENT NO.   : 5,444,829
DATED        : August 22, 1995
INVENTOR(S)  : Atsushi Kawabata et al.

Page 1 of 2

It is certified that error appears in the above-indentified patent and that said Letters Patent is hereby corrected as shown below:

| Column | Line | |
|---|---|---|
| 1 | 65 | Change "font" to --form--. |
| 2 | 40 | Change "is is" to --it is--. |
| 4 | 40 | Change "out put" to --output--. |
| 5 | 4 | Before "printer" insert --and the--. |
| 5 | 35 | Change "interconnedted" to --interconnected--. |
| 6 | 2 | Change "of" to --or--. |
| 6 | 3 | After "106," insert --and--. |
| 6 | 5 | Change "fop" to --for--. |
| 6 | 45 | Delete "for use". |

UNITED STATES PATENT AND TRADEMARK OFFICE
CERTIFICATE OF CORRECTION

PATENT NO. : 5,444,829
DATED : August 22, 1995
INVENTOR(S) : Atsushi Kawabata et al.

It is certified that error appears in the above-indentified patent and that said Letters Patent is hereby corrected as shown below:

| Column | Line | |
|---|---|---|
| 7 | 25 | Delete "then". |
| 9 | 44 | Change "claim 9" to --claim 2--. |
| 11 | 28 | After "that" insert --is--. |
| 12 | 6 | Change "dam" to --data--. |
| 12 | 25 | Change "as" to --to--. |

Signed and Sealed this

Twenty-third Day of January, 1996

Attest:

BRUCE LEHMAN

Attesting Officer     Commissioner of Patents and Trademarks